(12) United States Patent
Medford

(10) Patent No.: US 7,802,277 B2
(45) Date of Patent: Sep. 21, 2010

(54) INSERTING DATA OBJECTS INTO ENCRYPTED VIDEO STREAMS

(75) Inventor: Brad A. Medford, Austin, TX (US)

(73) Assignee: ATT Knowledge Ventures, L.P., Reno, NV (US)

( * ) Notice: Subject to any disclaimer, the term of this patent is extended or adjusted under 35 U.S.C. 154(b) by 918 days.

(21) Appl. No.: 11/355,283

(22) Filed: Feb. 15, 2006

(65) Prior Publication Data
US 2007/0192789 A1      Aug. 16, 2007

(51) Int. Cl.
*H04N 7/16* (2006.01)

(52) U.S. Cl. .......................... 725/25; 380/200; 380/240

(58) Field of Classification Search ............. 725/32–36; 380/28, 200, 240
See application file for complete search history.

(56) References Cited

U.S. PATENT DOCUMENTS

| | | | |
|---|---|---|---|
| 6,029,045 A * | 2/2000 | Picco et al. .................... 725/34 |
| 7,242,773 B2 * | 7/2007 | Candelore ................... 380/240 |
| 2002/0104083 A1 | 8/2002 | Hendricks et al. |
| 2002/0141591 A1 * | 10/2002 | Hawkes et al. .............. 380/278 |
| 2004/0003398 A1 | 1/2004 | Donian et al. |
| 2005/0193410 A1 | 9/2005 | Eldering |
| 2005/0207569 A1 * | 9/2005 | Zhang et al. .................. 380/28 |
| 2005/0283796 A1 | 12/2005 | Flickinger |
| 2007/0143491 A1 * | 6/2007 | Velrajan et al. ............. 709/231 |

* cited by examiner

*Primary Examiner*—John W Miller
*Assistant Examiner*—Oschta Montoya
(74) *Attorney, Agent, or Firm*—G. Michael Roebuck (57) ABSTRACT

In a particular embodiment a method is disclosed for inserting data objects into a video stream. The method encrypts a first portion of the video stream at a server, suspends encryption of a second portion of the video stream, and sends the first and second portions of the video stream to a client device for insertion of the object into the video stream. In another embodiment a system is disclosed for inserting data objects into a video stream. The system encrypts a first portion of the video stream at a server, suspends encryption of a second portion of the video stream, and sends the first and second portions of the video stream to a client device for insertion of the object into the video stream.

29 Claims, 6 Drawing Sheets

INSERTING DATA OBJECTS INTO ENCRYPTED VIDEO STREAMS

BACKGROUND OF THE ILLUSTRATIVE EMBODIMENT

1. Field of the Disclosure

The disclosure relates to insertion of data into a video stream.

2. Description of the Related Art

Encrypted video streams are being distributed to enforce digital rights management associated with the video streams. The encrypted video streams carry content that providers want to protect from piracy. The video streams are encrypted at their origin and broadly distributed. The video streams are usually decrypted at their end destination which may be a client device, such as a set top box (STB).

SUMMARY OF THE DISCLOSURE

In one aspect of a particular embodiment a method is disclosed for inserting data objects into an encrypted video stream which includes receiving a video stream for encrypting at a server, encrypting a first portion of the video stream at a server, suspending encryption of a second portion of the video stream after detecting a first signal, and sending the encrypted portion and unencrypted portion video stream from the server to a client device over a data network.

In another aspect of a particular embodiment the method includes wherein the first and second portions of the video stream are sent from the server to the client device for insertion of the object into the video stream at the client device.

In another aspect of a particular embodiment the method includes wherein the data object is an advertisement and the data network is an internet protocol (IP) network.

In another aspect of a particular embodiment the method further includes resuming encryption of a third portion of the video stream and sending the encrypted third portion of the video stream from the server to the client device.

In another aspect of a particular embodiment the method wherein resuming encryption further includes resuming encryption of the third portion of the combined video stream upon detecting a second signal.

In another aspect of a particular embodiment the first signal is an ad insertion signal.

In another aspect of a particular embodiment the first signal is part of the video stream.

In another aspect of a particular embodiment the method further includes sending an IP address for an advertisement to a client STB for switching from the video stream to the advertisement.

In another aspect of a particular embodiment the method further includes receiving at a router a signal from the STB to join an IP multicast for the advertisement and sending the IP multicast advertisement from the router to the STB.

In another particular embodiment a method is disclosed for inserting advertisements into an internet protocol (IP) video stream. The method includes receiving a video stream having a first and second portion, wherein the first portion of the video stream is encrypted and the second portion of the video stream is not encrypted; detecting a first signal in the second portion of the video stream; inserting an advertisement into the video stream after detection of the first signal; and sending the video stream with the advertisement inserted into the video stream to a client device.

In another aspect of a particular embodiment the e first signal is an ad insertion signal.

In another aspect of a particular embodiment the method further includes matching a sound level for the advertisement to a sound level for the video stream.

In another aspect of a particular embodiment the inserting an advertisement further includes detecting an I frame in the video stream for synchronizing the advertisement with the video stream.

In another aspect of a particular embodiment the method further includes encrypting a third portion of the video stream and sending the third portion of the video stream to the client device.

In another aspect of a particular embodiment the method further includes duplicating the video stream into a plurality of streams, inserting a different advertisement in each of the plurality of streams, and sending each one of the plurality of streams to a different market area.

In another aspect of a particular embodiment a system is disclosed for inserting an advertisement into an internet protocol (IP) video stream. The system includes a video encoder for encoding a video signal into a video stream and an encryption system for encrypting a video stream. The encryption system further includes a processor, a memory coupled to the processor, and a computer program stored in the memory; the computer program includes instructions to suspend encryption of the video stream; and a router for sending the video stream to a client device for inserting an advertisement into the video stream.

In another aspect of a particular embodiment the video encoder further includes a processor configured to insert the first signal into the video stream wherein the first signal is an advertising insertion signal.

In another aspect of a particular embodiment the computer program further includes instructions to resume encryption of the video after detection of a second signal in the video stream.

In another aspect of a particular embodiment the computer program further includes instructions to send an IP multicast address for an alternate advertisement to the client device.

In another aspect of a particular embodiment the system is disclosed for inserting an advertisement into a combined video stream having an encrypted portion and unencrypted portion. The system includes an ad server for providing the advertisement and a video splicer for splicing the advertisement into the video stream. The video splicer further includes a processor, a memory coupled to the processor, and a computer program stored in the memory. The computer program includes instructions to detect a first signal in the unencrypted portion of the video stream and instructions to insert the advertisement into the video stream upon detection of the first signal. In another aspect of a particular embodiment the computer program further includes instructions to match a sound level for the advertisement to a sound level for the video stream.

In another aspect of a particular embodiment the method further includes duplicating the video stream into M streams and placing a different advertisement in each of the M streams, and sending each of the M streams to a different market area.

In another aspect of a particular embodiment the method further includes sending an IP address for an advertisement to a STB for switching from the video stream to an advertisement.

In another embodiment a method is disclosed for receiving a video stream at a client device, the method including receiving a video stream at the client device, receiving an IP address for an advertisement at the client device; and switching from the video stream to an advertisement. In another embodiment a method is disclosed for receiving a video stream at a client device, wherein the client device decodes an encrypted portion of the video stream, and synchronizes with an unencrypted portion of the video stream. In another embodiment a method is disclosed for receiving a video stream at a server, wherein the video stream includes an encrypted portion of the video stream, and an unencrypted portion of the video stream, wherein the server distributes the video stream to a client device.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

DETAILED DESCRIPTION OF AN
ILLUSTRATIVE EMBODIMENT

An illustrative embodiment is presented through one or more of its various aspects to provide one or more advantages, such as those noted below. This system enables advertisement (ad) insertion systems to insert ads into video streams targeting specific neighborhoods or geographic areas (market areas) on a dynamic basis. This system allows for a dynamic allocation of the areas served based on dynamic business rules. In another embodiment encryption of the video stream is suspended into the video stream during portions of the video stream so that insertion signals in the video stream can be detected and ads inserted into the video stream.

The encrypted video stream is sent along with the ad insertion signaling. The ad insertion signaling may be in the video stream or out of band signaling sent to the ad insertion system. In a particular embodiment the ad insertion system provides outputs equal in number to the number of market areas. The video stream is duplicated and a different ad inserted into each copy of the video stream and sent to a different market area. These outputs will, during normal program periods, send out the program stream from the primary programs source, such as an integrated receiver decoder at a super hub office (SHO). The SHO encodes the video and provides insertion signaling and encryption of the video stream. During ad insertion avails (portions of the video stream which are available for ad insertion), the ad insertion system will stream ads for each of the designated market areas to video hub offices (VHOs). In an illustrative embodiment there can be N different ads in the duplicated streams going to N different market areas. An ad insertion IP router will route the N different ads to each of the N market areas based on the designations provided by the Business Rules system. Each of the N streams will have the same multicast IP stream address as the main program stream. Thus, the video stream duplication is transparent to a client device such as a STB receiving a video stream. The physical separation of the networks will help to prevent IP address conflicts from arising. At the end of the ad avail, the system will resume routing the main video program, without duplication, to the IP address.

Thus the system and method provides targeted advertising that will be cost effective. In addition, with the progression of IP networks in the market place, considerable attention has been placed on the security of the content. As a result Digital Rights Management (DRM) or encryption is typically placed on the IP video streams early in the processing, thus protecting the content through out the distribution process. This DRM encryption, however, makes the insertion on the audio/video streams into an encrypted video stream difficult if not impossible due to the requirements to detect I frames in the encrypted video stream. The I frame (or some other synchronizing reference signal) should be detected in order to insert the ad in the video stream and return to the program feed on the detection of the occurrence of I frames in the IP video stream. Encryption further complicates the ability to match the audio level of the inserted ad to the video stream into which it has been inserted since the sound level for the encrypted video is unknown. Finally, the P and B frames can be detected in order for the splicer to create I frames, if necessary. This system and method allows for the insertion of ads after the DRM system and will allow for the audio levels to be matched between the two sources, the national feed video stream from the SHO and the ad inserted by the ad insertion system.

In an illustrative embodiment the system and method suspends or turns off the DRM just prior to the time of the local ad avail time slot (local avail) in the video stream. During DRM suspension, MPEG video compression, e.g. splicing technologies can be used to splice or insert ads "in the clear", that is, in the absence of encryption during the time DRM encryption has been suspended or turned off. By suspending the DRM encryption only during or just prior to the local ad avail time slot in the video stream (i.e., such as motion picture expert group part 10 (MPEG)) can be decoded so that an ad splicer can detect and synchronize with a video stream synchronizing pulse such as an I frame in the MPEG video stream. Thus an ad can be spliced or inserted into the video stream at the appropriate time relative to the I frames or synchronizing pulses. In order to facilitate ad insertion, an ad signaling marker or "cue" is placed on the video (MPEG) transport stream to allow for a "pre-roll" or operational start up of the ad insertion system. A client device such as an STB receiving the video stream with the ad inserted is able to operate in an environment where the DRM is being enabled and disabled without any disruption of the viewing experience.

The cue signal or ad insertion signal from the Integrated Receiver Decoder (IRD) at the super hub office (SHO) are communicated to the DRM system. This communication of cue and ad signaling may be transmitted separately to the DRM system or encoded in the video (MPEG) stream as part of the video encoding process. If the cue and ad signaling to the DRM is part of the encoding process, signaling, such as Society for Cable and Telecommunications Engineers (SCTE) protocols can be used to signal ad avails and used to control DRM on/off. The communication of the ad insertion signaling and cue signal performs two functions: enabling and disabling of the DRM and cueing of the compressed video splicing and ad insertion systems. The cue signaling in the video stream can be part of the video compression data transport stream. By making the signaling part of the transport stream, latency issues between the cueing signaling system and video transport systems are reduced. As part of the video stream, the cue signal remains a fixed time ahead of an ad avail when transport delays over large distances are encountered.

In a video stream time line of an illustrative embodiment, the cue and ad insertion signaling are used to disable and enable DRM encryption of the video stream. A small amount of the regular program content may briefly be "in the clear" absent encryption after the cue or ad insertion signal is presented to allow for the compressed video splicer or ad insertion system to lock on to I frames in the video stream. The ad insertion signal is by example only as any type of signal having numerous purposes other than insertion of an ad can be inserted into the video stream.

Another illustrative embodiment of a system and method provides for STB specific ad insertions into video streams on IP networks. This system allows for ad insertion to take place down stream from the SHO on specific VHOs, servers, or STBs based on any type of targeted ad criteria or categorization, such as viewer demographics or other market based information.

Figure 1:
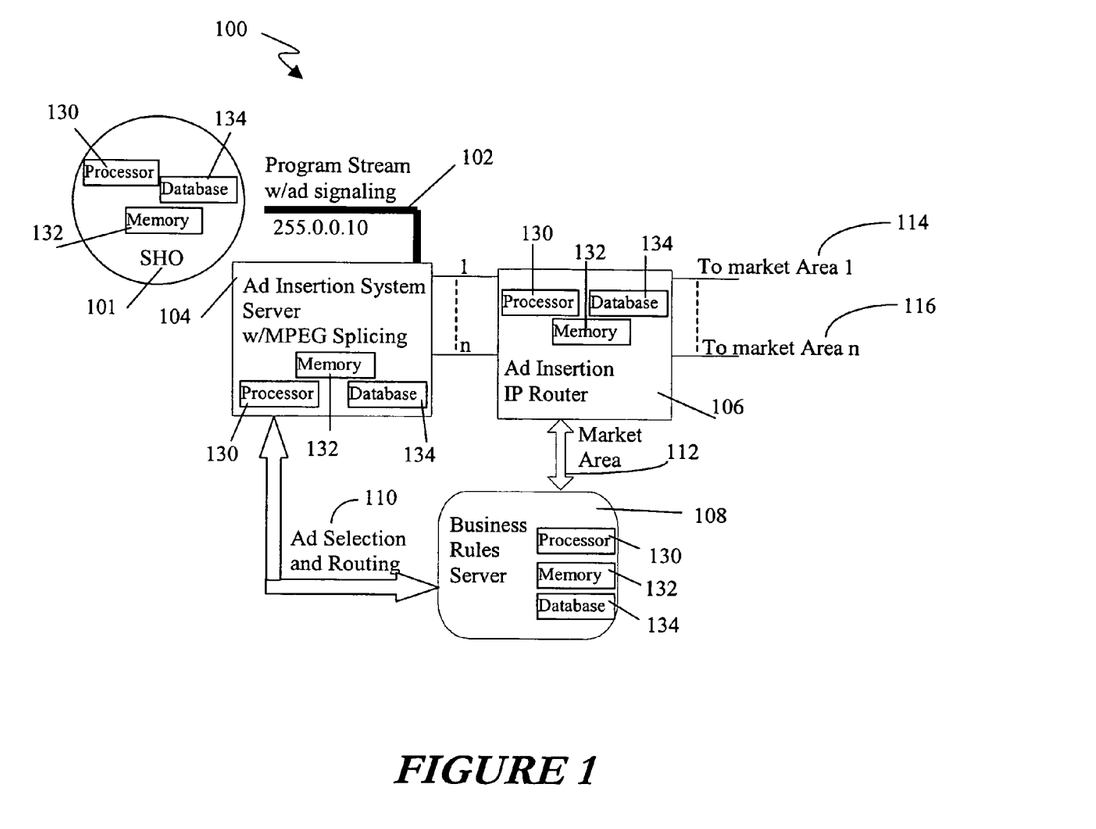
FIG. 1 is a schematic diagram depicting of an illustrative embodiment showing a video delivery system.

Turning now to FIG. 1, FIG. 1 is a schematic diagram depicting a SHO 101 sending a program stream with ad signaling 102. The video stream includes ad selection and routing 110 information. The ad selection and routing information 110 is sent to the business rules server 108. The business rules server 108 selects ads to be inserted for each market area 1-n. The program stream 102 is duplicated N times and N different ads are inserted by the ad insertion system server using video (e.g. MPEG) splicing 104. From the business rules server 108 the ad selection for each market area 112 is sent to the ad insertion IP router 106. The ad selected for each market area is inserted and sent to each market area. Each of the ad insertion server 104, ad insertion router 106, and business rules server include a processor 130, memory 132 coupled to the processor 130 and database in memory 134 coupled to the processor 130. The IP router sends the ad insertion selection to market areas, 1-n, 114, the ad is placed in the video stream at the ad insertion system server with video (e.g. MPEG) splicing 104. The video streams with ad signaling with the ad inserted 116 are sent out on an IP address to a particular market area 1-n.

Figure 2:
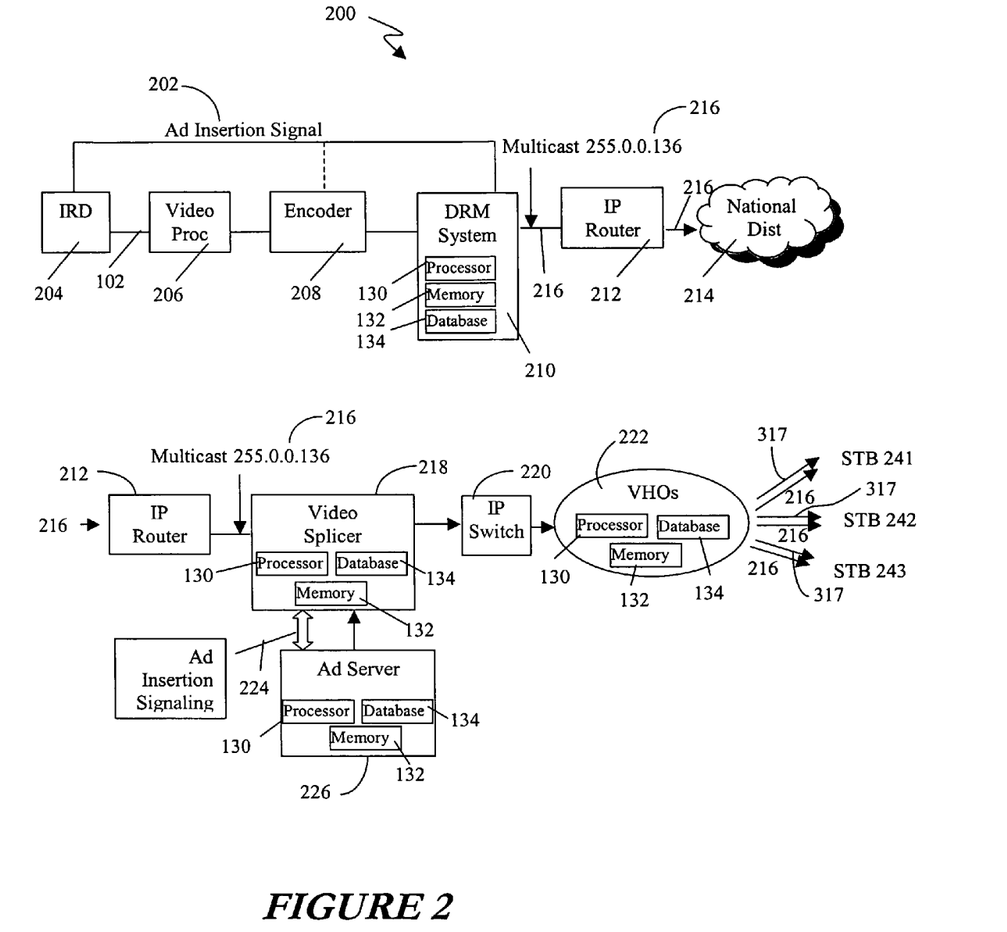
FIG. 2 is a schematic diagram depicting of another illustrative embodiment showing a video delivery system.

Turning now to FIG. 2, FIG. 2 is another illustrative embodiment showing a system for inserting an ad selected for insertion into a video stream. The cue signaling (ad insertion signaling or synchronization signaling 202) from the Integrated Receiver Decoder (IRD) 204 is detected and communicated to the Digital Rights Management (DRM) system 210. This cue ad insertion signaling 202 communication may be sent directly to the DRM system 210 or can be included as part of the video stream 102 as part of the video encoding process at encoder 208 communicated through the video processor 206 into the encoder 208 and continuing on to the DRM 210. Each of the DRM system 210, the video splicer 218, ad server 226, and VHOs 222 include a processor 130, memory 132 coupled to the processor 130 and database in memory 134 coupled to the processor 130.

The DRM system 210 encrypts the video stream 102. The DRM system 210 suspends or turns off DRM encryption of the video stream 102 based on receipt of the cue signaling or advertising signaling representing the beginning of an ad avail. The DRM system 210 resumes or turns on DRM encryption of the video stream 102 after a brief period or upon receipt of advertising insertion signaling representing the end of the ad avail in video stream 102 of the DRM system. The entire video stream 216 including the encrypted portions of the video stream with the DRM turned on and the unencrypted portions of the video stream with DRM turned off (briefly or during the ad avails) is then communicated to the IP router 212 and on to national distribution network 214.

The national distribution network 214 network sends the video stream 216 with DRM turned off during ad avails to regional or local IP routers 212. The video stream is sent from the national distribution network 214 as a multicast 216 such as an IP address 255.0.0.136 ("136"). The video stream multicast 216 is received at a video splicer 218 where ad insertion signaling or cue signal 224 is detected by ad server 226 and ad splicer 218. Ad server 226 and ad splicer 218 act together to sense I frames in the video stream 216 during DRM encryption off periods ("in the clear") to insert ads into the video stream. The video stream with inserted ad is then sent to IP switch 220 where the video stream with inserted ads is distributed to VHOs 222 for distribution to viewers. The VHOs includes processor/routers 130 to distribute the video stream 216 with inserted ads to STBs 241, 242, and 243. In a particular embodiment ad location IP address messages 317 are also sent to STBs 241, 242, and 243.

Figure 3:
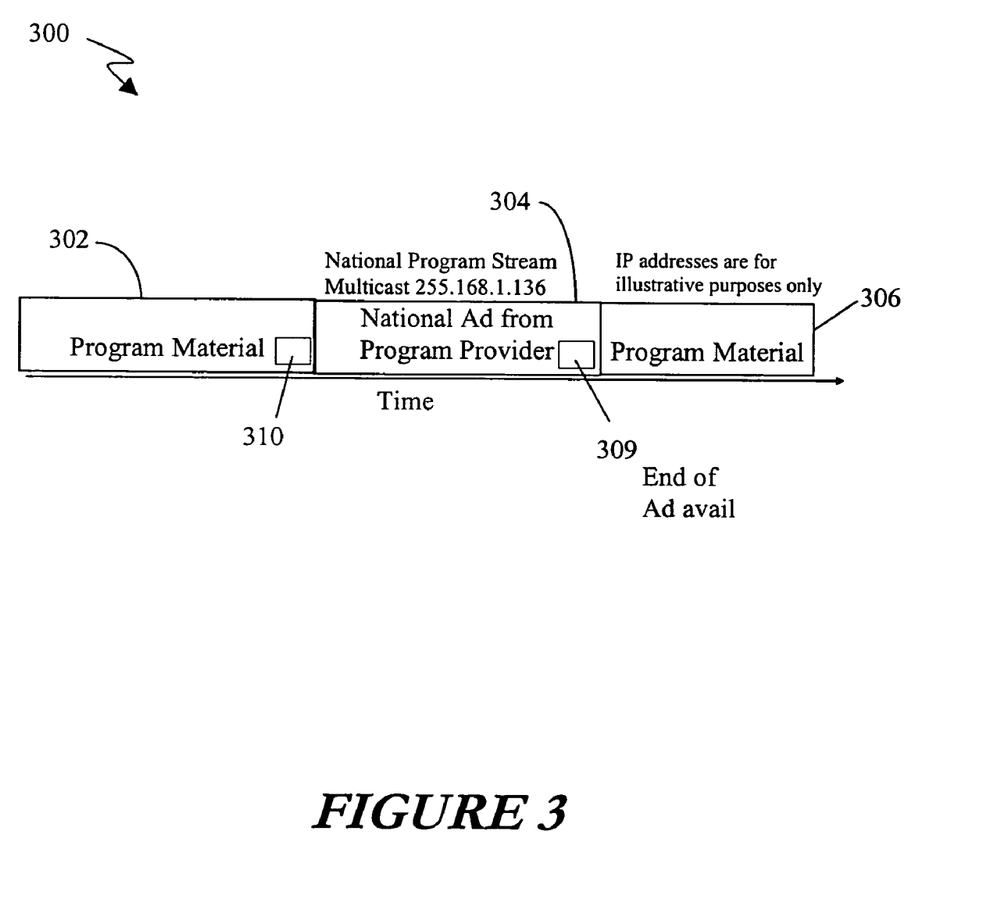
FIG. 3 is a time line diagram and signaling depicting another illustrative embodiment.

Turning now to FIG. 3, an example of a video stream 300 is illustrated. The video stream includes but is not limited to DRM encrypted program material 302, cue/video ad insertion signaling 310, ad avail including a non DRM (unencrypted) national ad 304, end of ad avail signaling 309, and followed by DRM encrypted program material 306 in the video stream. The DRM encryption is suspended or turned off for a brief period or after detection of an ad signal or cue signal 310 so that ad insertion splicers down stream from the SHO at a server or an ad switching set top box (STB) can detect the cue signal or advertising insertion signal in the clear, in the absence of encryption. The DRM encryption remains off briefly after the end of the inserted ad so that the I frame for the national program 306 can be synchronized by the STB for decryption and synchronization of the national video signal at the STB. The DRM can be turned off briefly before the end of an ad avail pulse 309 and resumed thereafter.

Figure 4:
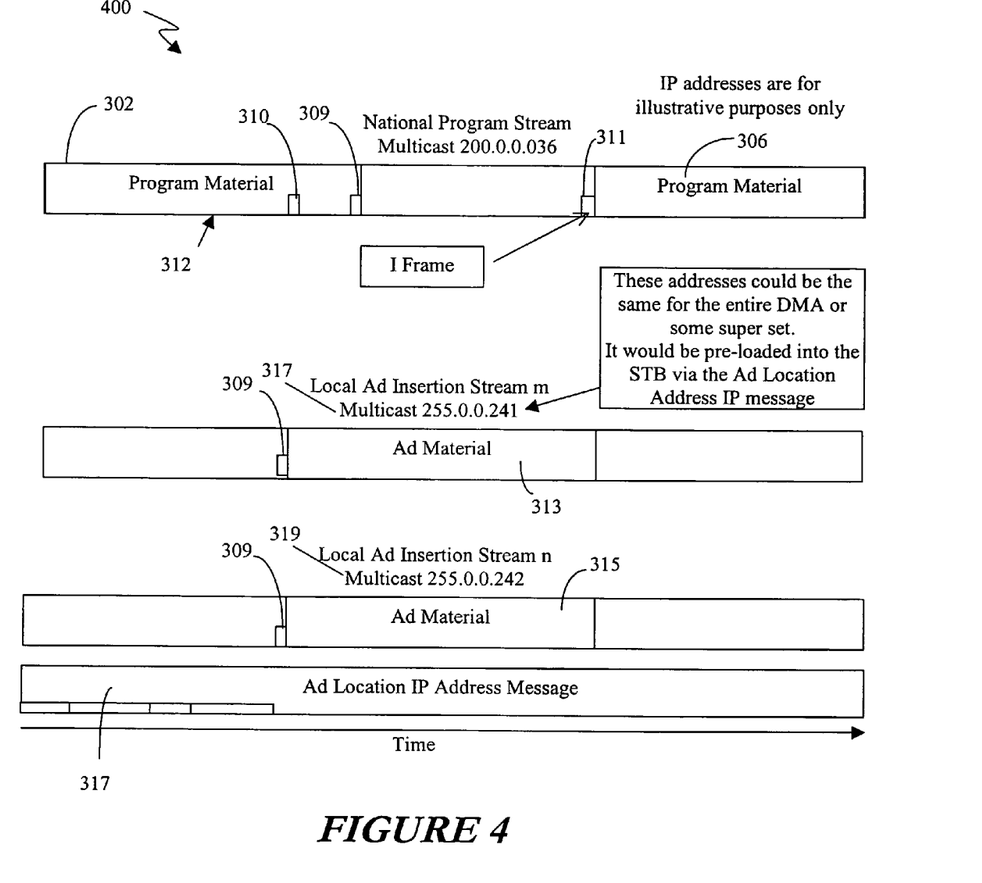
FIG. 4 is a schematic diagram depicting another illustrative embodiment.

Turning now to FIG. 4, FIG. 4 illustrates a particular illustrative embodiment of a video stream showing STB ad insertion signaling. As shown in FIG. 4, in a particular embodiment 400, ad insertion signaling 310 and I frames 309 are available and detected in the program material video stream 312. In a particular embodiment an ad location IP address message 317 is sent to the client device, e.g. an STB. The ad location IP address message includes an address for a multicast stream 255.0.0.241, 255.0.0.242, etc. to which a particular STB will request a multicast join for a particular IP address during the ad avail. An alternate advertisement 313, 315 is provided by the multicast and streamed to the STB during the ad avail. The ad avail or unencrypted portion of the video stream 400 begins after I frame 309 and ends after a brief period to allow down stream detection of the I frame 309 or after I frame 311 at the end of the ad avail. In a particular embodiment upon detection of I frame 309, or earlier upon detection of a cue signal 310 the STB sends a multicast join requesting the alternate ad material 313, 315 at the local ad insertion stream M 319 for STB 242 or local ad insertion stream N 319 for STB 241. Each STB is sent a local ad insertion or selection IP address selected to target a viewer associated with the particular STB.

Figure 5:
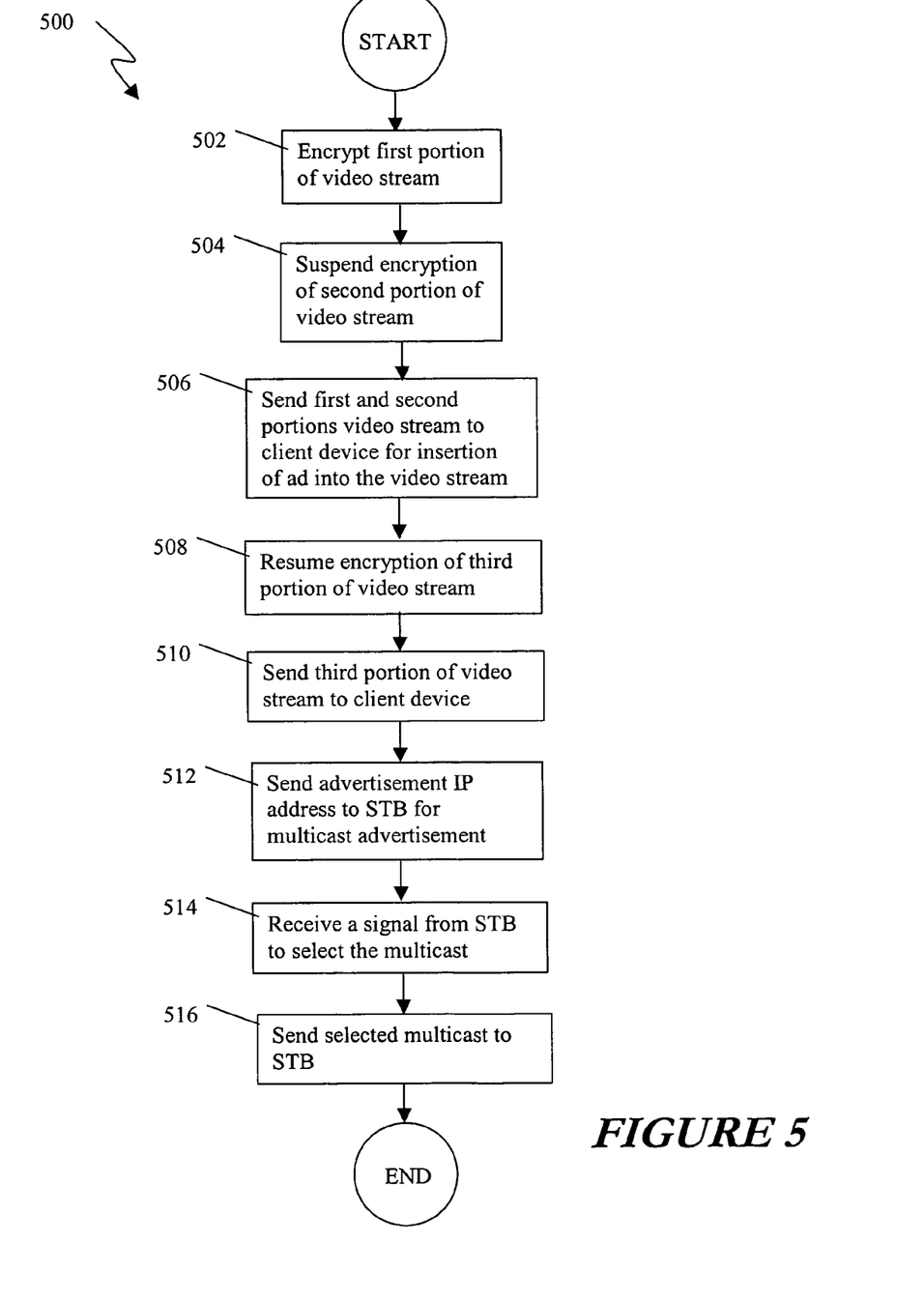
FIG. 5 is a flow diagram depicting another illustrative embodiment.

Turning now to FIG. 5, FIG. 5 is a flow diagram for inserting data objects into an encrypted internet protocol (IP) video stream. The encryption of the first portion of an IP video stream at the server at block 502. The encryption of the second portion of the IP video stream is suspended upon detecting the first insertion signal at block 504. The first and second portions of the video stream are sent from the server to the client device for insertion of the object into a second portion of the video stream at block 506. Encryption of the third portion of the video stream is resumed upon detection of the second insertion signal at block 508. The third portion of the video stream is sent to the client device at block 510. Switching instructions are sent to the STB for switching to multicast advertisement during the second portion of the video stream at block 512. A signal is received at the server from the STB to select the multicast at block 514. The selected multicast is sent from the server to the STB during the second portion of the video stream at block 516 and the process ends.

Figure 6:
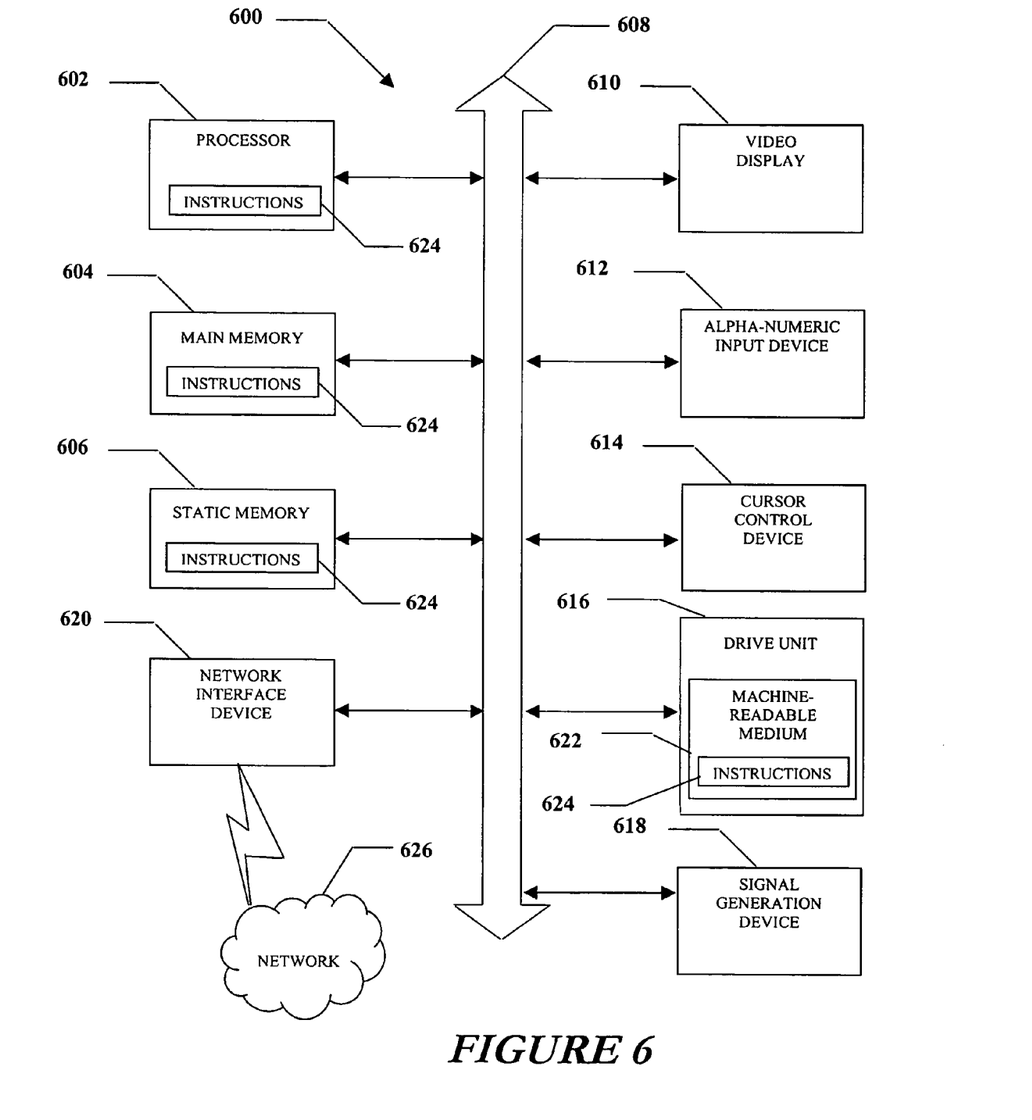
FIG. 6 is a diagrammatic representation of a machine in the form of a computer system within which a set of instructions, when executed, may cause the machine to perform any one or more of the methodologies of the illustrative embodiment.

Turning now to FIG. 6, FIG. 6 is a diagrammatic representation of a machine in the form of a computer system 600 within which a set of instructions, when executed, may cause the machine to perform any of one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystals display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A method for inserting a data object into a combined video stream, comprising:

receiving a combined video stream comprising program material video data and advertising insertion signals encoded in the program material video data;

encrypting a first portion of the combined video data stream thereby creating a first encrypted portion of the combined video data stream for sending to a client device;

detecting a first one of the advertising insertion signals in the combined video stream;

suspending the encrypting of the combined video stream at the server upon detection of the first one of the advertising signals thereby creating a first unencrypted portion of the combined video data stream for sending to the client device;

resuming the encrypting of the combined video data stream after detecting a second one of the advertising insertion signals in the combined video stream and after the occurrence of an I-frame in the combined video data stream, thereby creating a second encrypted portion of the combined video data stream; and sending the first and second encrypted portions and the unencrypted portion of the combined video stream from the server to the client device over a data network, wherein the client device decrypts the first encrypted portion of the combined video data stream and detects the I-frame in the unencrypted portion of the video data stream after the second one of the advertising insertion signals and uses the I-frame to synchronize with the combined video data stream to decrypt the second encrypted portion of the combined video stream.

2. The method of claim 1, wherein the combined video data stream is sent from the server to the client device for insertion of the data object into the combined video stream at the client device.

3. The method of claim 1, wherein the data object is an advertisement and the data network is an internet protocol (IP) network the method further comprising inserting the data object into the combined video stream data at an advertising insertion system in the IP network before the sending.

4. The method of claim 3, wherein the client device is a set top box (STB), the method further comprising:

sending an IP address for an advertisement to the STB for switching from the combined video stream to the advertisement.

5. The method of claim 4, further comprising:

receiving at the server a signal from the STB to join an IP multicast for the advertisement; and sending the IP multicast advertisement from the server to the STB.

6. The method of claim 1, wherein resuming encryption further comprises:

resuming encryption of the combined video stream after detecting an end of advertising avail signal.

7. The method of claim 1, wherein suspending encryption further comprises suspending encryption of the combined video data stream before sending the advertising insertion signal in the combined video stream to allow an advertising insertion device to detect the unencrypted advertising insertion signal in the unencrypted portion of the program material for enabling synchronization of an advertisement inserted into the unencrypted portion of the video stream.

8. The method of claim 7, wherein the synchronization signal further comprises at least one of signal selected from the group consisting of a motion picture expert group (MPEG) I frame, P frame and B frame.

9. A method for inserting advertisements into an internet protocol (IP) combined video stream comprising:

receiving at an advertising insertion system in an internet protocol television system the combined video stream comprising program material video data and advertising insertion signals, the combined video stream having a first, second and third portions, wherein the first and third portions of the combined video stream are encrypted and the second portion of the video stream is not encrypted, wherein the second unencrypted portion of the combined video data stream further comprises a second advertising insertion signal and an I-frame occurring after the second advertising signal for enabling a client device to synchronize with the I-frame for decrypting the third portion of the video data stream;

detecting a first one of the advertising insertion signals in the second unencrypted portion of the combined video data stream;

inserting advertisement data into the second unencrypted portion of the video stream after detection of the first advertising insertion signal; and sending the first and second portions of the video stream with the advertisement inserted into the video stream to a client device.

10. The method of claim 9, wherein the first one of the advertising insertion signals is an encryption signal.

11. The method of claim 9, further comprising:
matching a sound level for the advertisement data to a sound level for the second portion of the video stream.

12. The method of claim 9, wherein inserting an advertisement further comprises:
detecting an I frame in the second portion of the video stream for synchronizing the advertisement with the video stream.

13. The method of claim 9, further comprising:
encrypting a third portion of the combined video data stream upon detecting a second signal; and
sending the encrypted third portion of the video stream to the client device.

14. The method of claim 9, the method further comprising:
duplicating the video stream into a plurality of streams;
inserting a different advertisement in each of the plurality of streams; and
sending each one of the plurality of streams to a different market area.

15. A video content management system for inserting an advertisement into an internet protocol (IP) video stream, comprising:
an encryption system for encrypting a combined video data stream, the encryption system further comprising:
a processor;
a memory embedded in a tangible computer readable medium coupled to the processor;
a computer program, stored in the memory, the computer program comprising:
instructions to begin encrypting the combined video data stream creating a first encrypted portion of the combined video data stream, instructions to suspend the encrypting of the combined video data stream thereby creating a second unencrypted portion of the video data stream after detecting a first advertisement insertion signal in the combined video data stream, instructions to resume encrypting of the video data stream after detecting a second advertisement insertion signal and after detecting an I-frame in the combined video data stream; and
a router for sending the combined video data stream comprising an encrypted portion of the video stream and an unencrypted portion of the combined video data stream to a client device for inserting an advertisement into the combined video data stream after the client device detects the first advertising insertion signal.

16. The system of claim 15, further comprising:
a video encoder for encoding a video signal wherein the video encoder further comprises a processor configured to insert the first advertising insertion signal into the video stream.

17. The system of claim 15, the computer program further comprising:
instructions to resume encryption of the video stream after detection of a second advertising insertion signal in the combined video data stream.

18. The system of claim 15, the computer program further comprising:
instructions to send an internet protocol IP multicast address for an alternate advertisement to be inserted in the combined video data stream the client device.

19. A video content processing system for inserting an advertisement into a combined video stream comprising video data and advertising insertion signals having an encrypted portion and an unencrypted portion, the system comprising:
an ad server for providing the advertisement;
a video splicer for splicing the advertisement into the combined video stream, the video splicer further comprising:
a processor;
a memory embedded in a tangible machine readable medium coupled to a processor;
a computer program stored in the memory, the computer program comprising: instructions to begin encrypting the combined video data stream creating a first encrypted portion of the combined video data stream, instructions to suspend the encrypting of the combined video data stream thereby creating a second unencrypted portion of the video data stream after detecting a first advertisement insertion signal in the combined video data stream, instructions to resume encrypting of the video data stream after detecting a second advertisement insertion signal and after detecting an I-frame in the combined video data stream; and
a router for sending the combined video data stream comprising an encrypted portion of the video stream and an unencrypted portion of the combined video data stream to a client device for inserting an advertisement into the combined video data stream after the client device detects the first advertising insertion signal.

20. The system of claim 19, the computer program further comprising:
instructions to match a sound level for the advertisement to a sound level for the unencrypted portion of the combined video data stream.

21. The system of claim 19, the method further comprising:
duplicating the combined video data stream into a quantity, M streams and inserting a different advertisement in each of the M streams; and
sending each of the M streams to a different market area.

22. The system of claim 19, wherein the client device is a set top box (STB), the method further comprising:
sending an IP address for an advertisement to the STB for switching from the video stream to the IP address for the advertisement.

23. A non-transitory computer readable medium containing instructions that when executed by a computer perform a method for inserting data objects into a combined video stream, the computer program comprising:

instructions to receive a combined video stream comprising program material video data and advertising insertion signals encoded in the program material video data;

instructions to encrypt a first portion of the combined video data stream thereby creating a first encrypted portion of the combined video data stream for sending to a client device;

instructions to detect a first one of the advertising insertion signals in the combined video stream;

instructions to suspend the encrypting of the combined video stream at the server upon detection of the first one of the advertising signals thereby creating a first unencrypted portion of the combined video data stream for sending to the client device;

instructions to resume the encrypting of the combined video data stream after detecting a second one of the advertising insertion signals in the combined video stream and after the occurrence of an I-frame in the combined video data stream, thereby creating a second encrypted portion of the combined video data stream; and instructions to send the first and second encrypted portions and the unencrypted portion of the combined video stream from the server to the client device over a data network, wherein the client device decrypts the first encrypted portion of the combined video data stream and detects the I-frame in the unencrypted portion of the video data stream after the second one of the advertising insertion signals and uses the I-frame to synchronize with the combined video data stream to decrypt the second encrypted portion of the combined video stream.

24. The medium of claim 23, wherein in the encrypted and unencrypted portions of the video data stream are sent from the server to the client device for insertion of the object into the combined video data stream at the client device.

25. The medium of claim 23, wherein in the method the data object is an advertisement and the data network is an internet protocol (IP) network.

26. The medium of claim 23, the method further comprising:

resuming encryption of a third portion of the video stream; and sending the encrypted third portion of the video stream from the server to the client device.

27. A non-transitory computer readable medium containing instructions that when executed by a computer perform a method for inserting advertisements into an internet protocol (IP) video stream comprising, the computer program comprising:

instructions to receive at a client device a combined video data stream comprising video data and advertising insertion signals having a first and second encrypted portions, and a first unencrypted portion;

instructions to detect a first of the advertising insertion signals in the second portion of the video stream;

instructions to insert an advertisement into the second portion of the combined video data stream after detection of the first advertising insertion signal;

instructions to detect a second advertising insertion signal and an I-frame in the first unencrypted portion of the combined video data; and instructions to synch with the I-frame to decrypt a second encrypted portion of the combined video data stream.

28. The medium of claim 27, wherein the first signal is an advertising insertion signal.

29. The medium of claim 27, the method further comprising:

instructions to match a sound level for the advertisement to a sound level for the second portion of the video stream.

* * * * *